United States Patent
Dowd et al.

[11] Patent Number: 5,082,323
[45] Date of Patent: Jan. 21, 1992

[54] SUNSHADE FASTENER MODULE FOR USE WITH MODULAR HEADLINER

[76] Inventors: James D. Dowd, 35787 Congress Rd., Farmington Hills, Mich. 48018; David M. Hilborn, 8439 Hickory, Sterling Heights, Mich. 48077; Roy Weilant, 5076 Timber Ridge Trail, Clarkston, Mich. 48016; Abdolhossein R. Lawassani, 845 Sheryl, Pontaic, Mich. 48054

[21] Appl. No.: 657,606

[22] Filed: Feb. 19, 1991

Related U.S. Application Data

[63] Continuation of Ser. No. 205,150, Jun. 10, 1988, abandoned.

[51] Int. Cl.⁵ .......................... B60R 13/02; B60J 3/00
[52] U.S. Cl. ...................... 296/214; 296/97.13; 24/297; 24/453
[58] Field of Search ............ 296/97.1, 97.6, 97.9, 296/97.12, 97.13, 214; 248/285; 24/297, 326, 453, 458, 616

[56] References Cited

U.S. PATENT DOCUMENTS

| | | | |
|---|---|---|---|
| 2,939,741 | 6/1960 | Keating et al. | 296/97.13 |
| 3,017,217 | 1/1962 | Keating | 296/97.13 |
| 3,151,907 | 10/1964 | Morgan | 296/97.9 |
| 3,399,923 | 9/1968 | Bornefeld et al. | 296/97.13 |
| 3,433,525 | 3/1969 | Augunas | 296/97.1 |
| 3,889,320 | 6/1975 | Koscik | 24/297 |
| 4,148,519 | 4/1979 | Hollar, Jr. | 296/97.13 |
| 4,149,749 | 4/1979 | Canal | 296/97.1 |
| 4,178,035 | 12/1979 | Cziptschirsch | 296/97.13 |
| 4,188,440 | 2/1980 | Doerer | 296/214 X |
| 4,352,522 | 10/1982 | Miller | 296/214 |
| 4,390,202 | 6/1983 | Flowerday et al. | 296/97.13 |
| 4,529,157 | 7/1985 | Suman et al. | 296/97.13 X |
| 4,553,309 | 11/1985 | Hess et al. | 29/450 |
| 4,569,552 | 2/1986 | Marks | 296/97.13 |
| 4,610,478 | 9/1986 | Tervol | 296/214 |
| 4,690,450 | 9/1987 | Boerema et al. | 296/97.9 |

FOREIGN PATENT DOCUMENTS 0057886 8/1982 European Pat. Off.
3442321 5/1986 Fed. Rep. of Germany ..... 296/97.1

*Primary Examiner*—Margaret A. Focarino
*Assistant Examiner*—Andrew C. Pike

[57] ABSTRACT

A sunshade fastener module for use in a motor vehicle secures a sunshade and headliner substrate to one another. Additionally, the fastener includes mounts for securing the fastener and the attached sunshade and substrate to the body structure of the motor vehicle.

7 Claims, 5 Drawing Sheets

SUNSHADE FASTENER MODULE FOR USE WITH MODULAR HEADLINER

This is a continuation of application Ser. No. 205,150, filed June 10, 1988, now abandoned.

CROSS REFERENCE TO RELATED APPLICATIONS

This application relates to the following simultaneously filed patent applications: U.S. application Ser. No. 204,804, now U.S. Pat. No. 4,913,484 for HEADLINER AND SUNSHADE FASTENER by James D. Dow, David M. Hilborn, Roy Weilant and Abdolhossein R. Lawassani; U.S. application Ser. No. 204,663, now U.S. Pat. No. 4,983,866, FOR MOTOR VEHICLE BODY STRUCTURE FOR RECEIVING SNAP-FIT MODULAR HEADLINER FASTENERS by James D. Dowd and David M. Hilborn; U.S. application Ser. No. 204,662, now U.S. Pat. No. 4,981,323, for ASSIST STRAP FOR A MODULAR HEADLINER by James D. Dowd, David H. Hilborn, Matthew J. Brown and Richard P. Bozyk; U.S. application Ser. No. 205,139, now U.S. Pat. No. 4,902,068, for MODULAR HEADLINER ASSEMBLY by James D. Dowd and Darrel Hampton; U.S. application Ser. No. 205,257, now abandoned, for SUNSHADE WITH SNAP-FIT FASTENER by James D. Dowd, David M. Hilborn, Roy Weilant, and Abdolhossein R. Lawassani; U.S. application Ser. No. 204,670, now U.S. Pat. No. 4,981,322, for ASSIST STRAP FOR A MOTOR VEHICLE by James D. Dowd, David M. Hilborn, and Matthew J. Brown; U.S. application Ser. No. 205,130, now U.S. Pat. No. 4,844,533, for FRONT LAMP MODULE AND SUNSHADE SUPPORTS FOR MODULAR HEADLINER by James D. Dowd, David M. Hilborn, Roy Weilant, and Abdolhossein R. Lawassani; U.S. application Ser. No. 205,265, now U.S. Pat. No. 4,893,867, for CONSOLE MOUNTED TO A HEADLINER by David M. Hilborn and Stephen P. McGarry; U.S. application Ser. No. 205,131, now abandoned for MODULAR HEADLINER INCLUDING A WIRE HARNESS by James D. Dowd, Darrel Hampton, and Stephen P. McGarry.

TECHNICAL FIELD

This invention relates to a sunshade fastener module for use with a modular headliner. More specifically, the present invention relates to a fastener for securing a sunshade and a headliner together and for securing the combination in snap-fit relationship to a body structure of a motor vehicle.

BACKGROUND OF THE INVENTION

Motor vehicle headliners have been mounted to the body structure of a vehicle in a series of individual steps on a vehicle assembly line. Several steps are involved to install a headliner substrate to a vehicle and to install various accessory components to either the substrate or the vehicle to hold the substrate in position. This type of installation in an assembly line requires numerous assembly stations and numerous assembly operators.

The herein invention is concerned with a modular headliner which is assembled unitary element to a motor vehicle at a single assembly station. Additionally, the herein described subassembly of a modular headliner is designed to provide a fastener integrating a sunshade and substrate such that the combination may be snap-fit to the vehicle body structure. Furthermore, the operator may snap-fit the module to the vehicle without needing to enter the vehicle to mount the subassembly or to screw the subassembly into position. Furthermore, the fastener is secured directly to a sheet metal member of the body structure to the vehicle. There is no need to secure a receptacle to the body structure for the purpose of receiving the fastener prior to the assembly of the fastener or subcombination to the vehicle.

A portion of an entire modular headliner may be secured with the herein described fastener such that the sunshade and the substrate are appropriately secured to the sheet metal body structure of the vehicle in this snap-fit relationship.

The fastener as described herein includes a cover and the base and acts to secure the substrate therebetween while maintaining the end of a pivot rod supporting the sunshade in position. Consequently, the two elements are each secured to one another with the specific fastener described to form this module. The fastener has the distinct feature of snap-fitting into the sheet metal structure of the vehicle. Hence, an entire module is disclosed which may provide a unitary subcombination for mounting during the vehicle assembly process.

SUMMARY OF THE INVENTION

It is an object of the present invention to provide a sunshade fastener module for use with a modular headliner.

It is another object of the present invention to provide a combination sunshade, substrate and fastener for use in securing a portion of an entire modular headliner system together.

It is a still further object of the present invention to provide a fastener capable of snap-fit relationship with a sheet metal structure of the car which also serves to secure the sunshade and substrate to the headliner as a single module.

It is another object of the present invention to provide a safe, economical, reliable and easy to assemble sunshade, substrate fastener module.

Other objects will be apparent from the description to follow and the claims appended hereto.

The above objects are achieved according to a preferred embodiment of the invention by the provision of a modular headliner for mounting to a motor vehicle, said vehicle including a body structure defining a sheet metal opening and including a substrate generally configured to fit adjacent the roof of the vehicle, said substrate defining a substrate opening, the sunshade for the motor vehicle including a pivot rod end fitting mounted on a pivot rod and a sunshade substrate fastener for securing the sunshade to the substrate, said sunshade substrate fastener including a base having a base rod opening through which the pivot rod extends, said base rod opening being configured to allow the pivot rod end fitting to pass therethrough in a first orientation and to prevent the pivot rod end fitting from passing therethrough in a second orientation whereby the rod is retained therein and a bezel portion sufficiently sized to cover the substrate opening, and a cover for mating with the base, said cover including a platform which when assembled to the base is spaced from the base by spacer ribs, said spacer ribs being located within the substrate opening and said platform extending generally parallel to the bezel portion to sandwich the substrate between the bezel portion and the platform and a means for securing the cover to the base whereby the pivot rod and the substrate are secured together by the sunshade, substrate fastener. Additionally disclosed are snap fit means in the form of a pair of flexible legs for securing the fastener to the vehicle body structure.

Further disclosed is a sunshade, substrate fastener module for use with a modular headliner to be mounted adjacent the roof structure of a motor vehicle, said vehicle having a body structure defining sheet metal openings, which module includes a sunshade, a substrate portion of a headliner, and a fastener, said fastener including means for securing a sunshade to the fastener and said fastener including means to secure the substrate to the fastener whereby a sunshade, substrate fastener combination is formed. The fastener further includes means for mounting the fastener and the attached sunshade and substrate to the vehicle body structure.

BRIEF DESCRIPTION OF THE DRAWINGS

FIG. 1A is a perspective view of FIG. 1 taken at the indicated line.

FIG. 3A is sectional view of a portion of the sunshade/headliner fastener taken in the direction of line 3A—3A of FIG. 3.

FIG. 3B is a sectional view of FIG. 3A taken at the indicated line.

FIG. 3C is a sectional view of FIG. 3A taken at the indicated line.

FIG. 4A is a side view of a sunshade fastener.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figure 1:
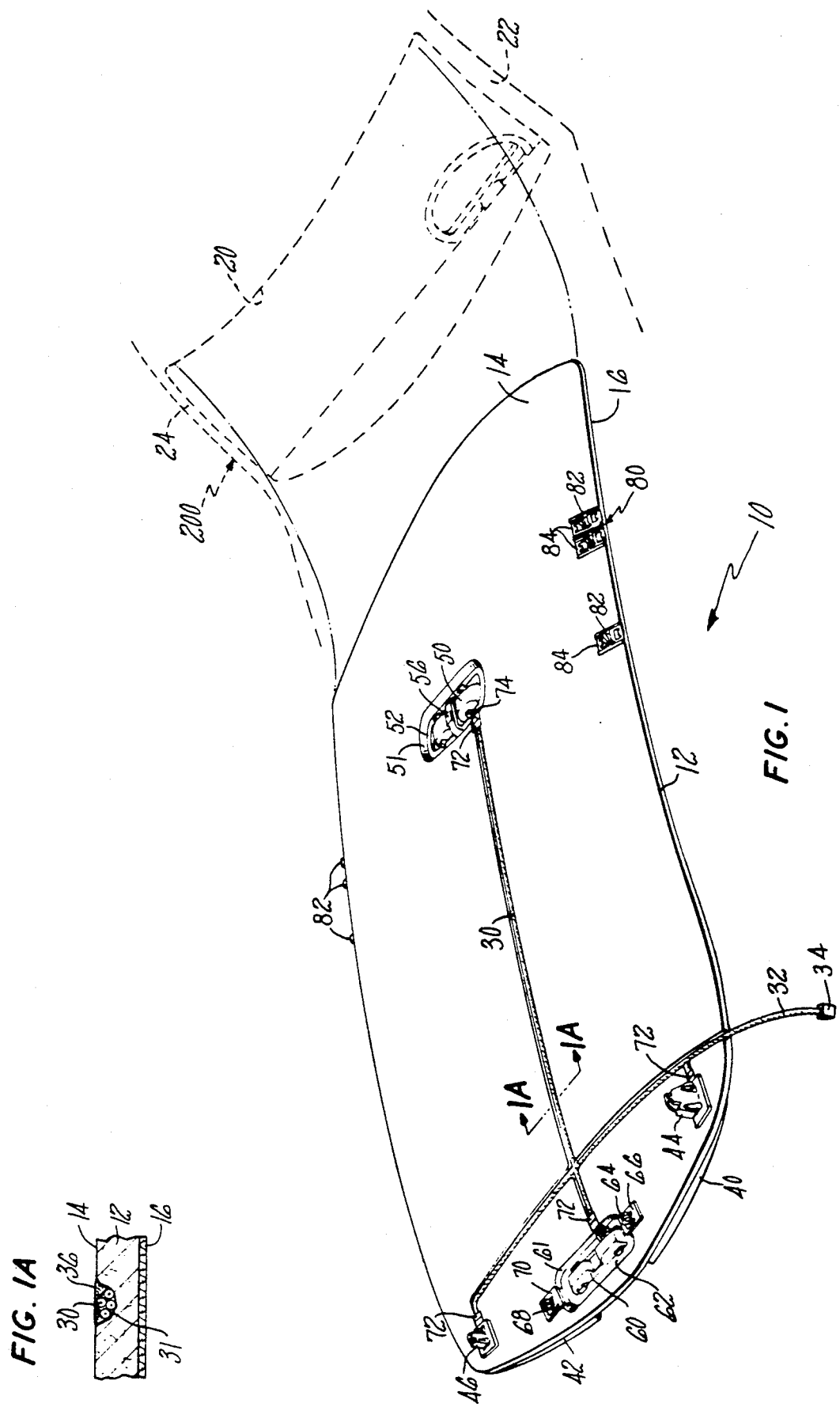
FIG. 1 is a perspective view of a modular headliner assembly positioned adjacent the vehicle windshield opening for assembly therethrough.

FIG. 1 is a perspective view of a modular headliner assembly 10 about to be installed into motor vehicle 200. The motor vehicle is shown having windshield opening 20, left A-pillar 22 and right A-pillar 24. The modular headliner is mounted into the partially assembled vehicle through the windshield or other large window opening which could also be the rear window opening. In this manner, the body structure of the vehicle may be assembled prior to the modular headliner assembly being mounted thereto.

Modular headliner assembly 10 consists of all those components between the decorative interior surface of the headliner and the body structure of the vehicle. The modular headliner 10 must be appropriately configured such that when assembled, the modular headliner may be shipped, handled and installed in the vehicle and potentially mistreated during a portion of this process without having the interior surface damaged, without distortion or bending due to uneven stresses and without impacting the function of the various components thereof.

As may be specifically seen in FIGS. 1 and 1A, the headliner includes substrate 12 made from a material such as molded fiberglass, styrene, cardboard, a polymeric material, or as is otherwise as known in the art. Substrate 12 has mounted on the surface thereof a decorative covering or surface 16 which is the surface visible to an occupant of the finished vehicle. The opposite side of substrate 12 from that on which decorative surface 16 is mounted is the non-show surface, surface 14.

Left sunshade 40 and right sunshade 42 are mounted to the substrate by the use of left sunshade fastener 44 and right sunshade fastener 46.

Additionally shown as part of the modular headliner are assist straps 80 which are retained to the modular headliner by retainers 84 interacting with assist strap legs 82.

Also shown as a portion of modular headliner 10 is center console 50 which is shown secured within depressed portion 51 formed in the substrate to retainer 52. A mesh fastener 56 is shown located to extend upwardly from retainer 52.

Likewise, forward console 60 is shown mounted within depressed portion 61 formed in the headliner in combination with forward retainer 62. Forward retainer 62 includes an outwardly projecting area through which left inboard sunshade support 64 and right inboard sunshade support 68 extend. Appropriate retainers 66 and 70 are shown for securing the legs of the inboard sunshade supports to hold the inboard sunshade supports in position.

Further shown as part of the modular headliner is wire harness 30 having a wire bundle 32, including a vehicle electrical connector 34 and a series of accessory connectors 72 located adjacent each accessory requiring electrical connections. Complementary connectors 74 extend from each accessory and mate with accessory connectors 72 to form a completed wire harness. Vehicle electrical connector 34 is typically connected to a mating connection extending from the vehicle body electrical system in an easy to access area such as one of the A-pillars.

Additionally it may be seen that the modular headliner wire harness is secured within substrate channels 31 such that the wire is maintained therein. Additionally, adhesive 36 may be placed over the wire bundle to secure the wire bundle within the channel. In this manner, the wires are protected from inadvertent contact with roof bows or other roof structure and the potential for damage to the wires is avoided.

As may be seen in FIG. 1, the modular headliner assembly is about to be inserted into the vehicle for assembly thereto. The left and right sunshade fasteners, 44 and 46, extend upwardly and include legs for engaging with the metal structure of the vehicle to mount the same thereto. Likewise, assist straps 80 have upwardly extending legs 82 which engage appropriate openings in the body structure to also secure the modular headliner to the vehicle. Furthermore, mesh fastener 56 may appropriately interact with a corresponding mesh fastener to likewise secure the headliner to the body structure. Hence, the left and right sunshade fasteners and at least one of the two assist strap handles are used for securing the modular headliner assembly to the motor vehicle.

Furthermore, the mesh fastener of retainer 52 may likewise serve such a function. Also not to be ignored are the right inboard sunshade support and the left inboard sunshade support which also includes legs for engaging the sheet metal structure of the vehicle.

In order to assemble the modular headliner to the vehicle, the headliner is slid through a large window opening such as a windshield and placed in general position to which it is to be mounted. An operator then positions one of the sunshade fasteners to feel when the fastener mates with an appropriate opening The sunshade fastener is then snap-fit into the opening to mount that portion of the modular headliner. The same process is then followed with the other sunshade fastener, the assist straps and the inboard sunshade supports. In this manner, the entire modular headliner may be snap-fit to the motor vehicle. Thereafter, an appropriate electrical connection is made at vehicle electrical connector 34 and the assembly process for the headliner is complete.

Figure 2:
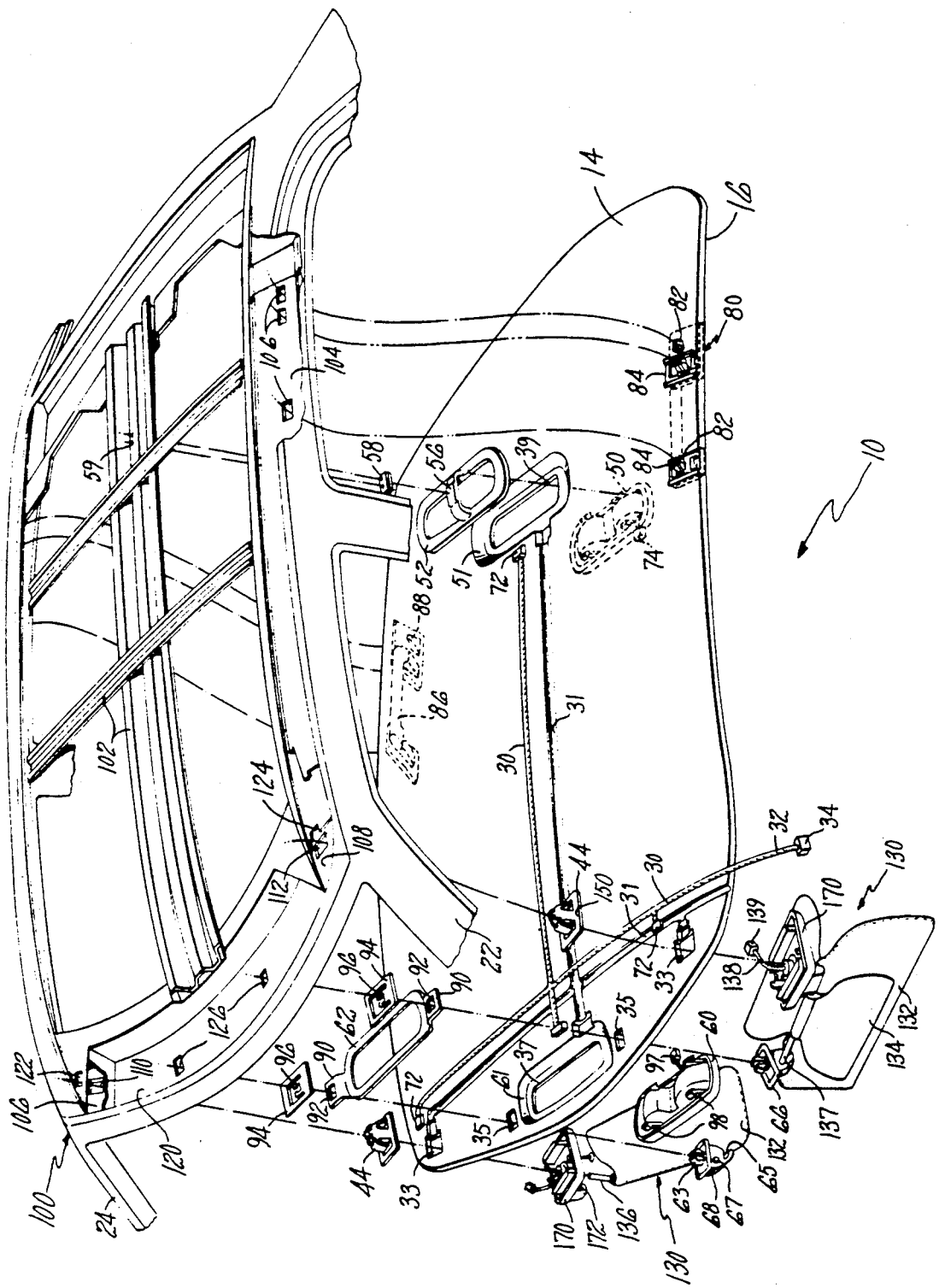
FIG. 2 is an exploded perspective view of a modular headliner assembly and appropriate portions of the vehicle body structure.

In FIG. 2 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 39, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure This mesh retainer is preferably a Dual Lock ® retainer By the selection of Dual Lock material, it is possible that the headliner may slide into position with one portion of the Dual Lock ® fastener sliding relative to the other. The Dual Lock ® fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 84 projecting through the headliner substrate. Retainers 82 are shown in engagement with legs 84 to secure the assist straps to the headliner. An assist strap may include handle 86 and a coat hook 88, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 2 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacle portions to do such.

Figure 3:
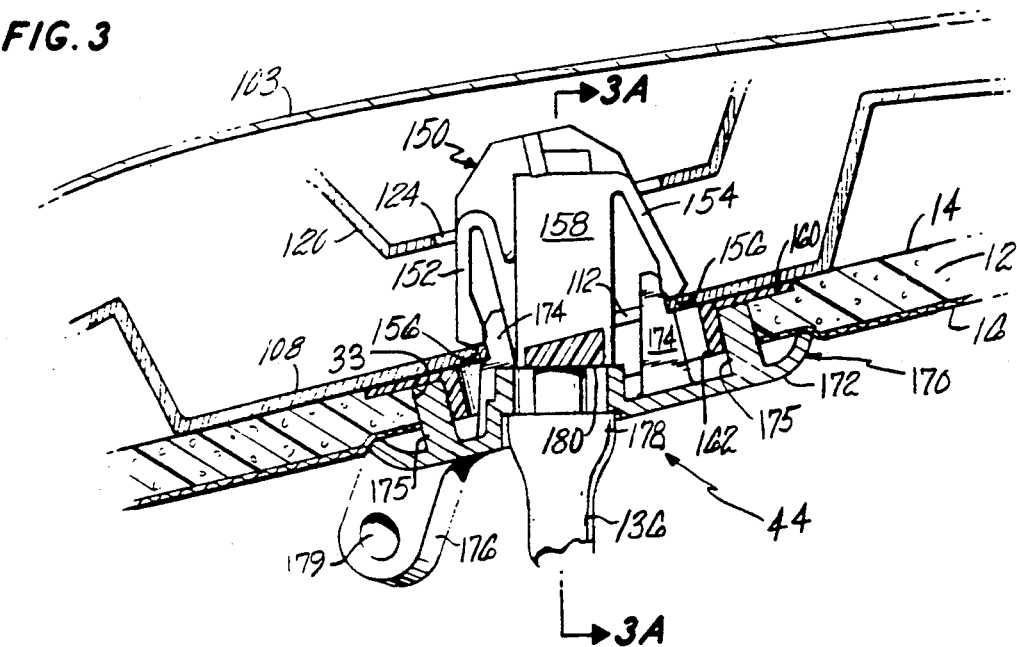
FIG. 3 is a partially sectional left side view of a sunshade/headliner fastener shown mounted in the vehicle.

FIG. 3 shows a partially sectional view of fastener 44 secured to a vehicle As may be seen therein, the fastener is positioned below roof 103 and fits in opening 124 of header 120 and through left A-pillar opening 112 of A-pillar inner 108. Additionally, substrate 12 having a non-show surface 14 and decorative surface 16 are shown.

Fastener 44 has a cover 150 and base 170 which includes projection for receiving secondary visor 176 which defines an opening therein. Pivot rod flange 178 is shown encompassing pivot rod 136 although it might be considered to be a portion of the pivot rod as opposed to a portion of the base. Additionally, the base includes a torque fitting support 180 through which the pivot rod will extend. The torque fitting will engage the top of the torque fitting support such that the pivot rod is maintained to the base by the torque fitting engaging the torque fitting support. The torque fitting support may include a torque fitting opening 184 which allows the torque fitting to be inserted through the base, said torque fitting including a keyway and a wire guide area. Once the torque fitting is inserted through the torque fitting support, the torque fitting is then rotated to prevent its removal through the torque fitting support and is retained from rotation therein by torque fitting 183 indent. The cover then secures the torque fitting in the position to which it has been rotated.

Bezel 172 is shown extending generally parallel with substrate 12 and of sufficient area to engage substrate 12 such that substrate 12 will be pushed upwardly by bezel 172 as the fastener is mounted. Centering arms 174 and bezel ribs 175 are also shown extending upwardly from bezel 172.

Cover 150 defines a pair of flanges 152 and 154 extending outwardly therefrom. These flanges are flexible and may be compressed to allow the cover to fit through the left A-pillar opening 112. Each flange has a curved end 156, and when inserted through the opening, the flange is compressed and as the cover approaches the fully inserted position, the flange bows outwardly with only the downward most end being received by the edges of the opening. The end of the flange is curved and the combination of the bowing of the flange and the curve provides a camming action which, once the flange is released, will cause the flange to snap behind A-pillar inner 108 as shown such that the flanges act to prevent the fastener from being moved downwardly. The center of cover 150 is defined as torque fitting receiving area 158 into which the torque fitting connected to the rod will be maintained. Cover 150 further includes platform portion 160 which engages the top surface of substrate 12 and the opposite surface of A-pillar inner 108 from the surface that the flanges engage. Cover 150 additionally includes a platform rib 162 extending downwardly from platform portion which acts to engage bezel 172 and bezel ribs 175 such that spacing is provided therebetween, said spacing being appropriately sized to receive substrate 12. The engagement of platform rib 162 and bezel rib 175 act to align the cover to the fastener and prevent any applied torque from rotating the base without transmitting the rotation to the cover and consequently the vehicle body structure.

Referring now to FIG. 3A, there may be seen a partial sectional view of the fastener. Therein, cover 150 is shown with torque fitting 164 contained therewithin. Torque fitting 164 is typically molded to the pivot rod. Annular indent 166 is provided on the pivot rod to engage the torque fitting to prevent linear displacement of the torque fitting along the pivot rod. Torque fitting 164 is maintained by cover 150 in the desired position, and will not rotate relative thereto. The rod, however, will rotate relative the torque fitting, and it is this torque relationship that provides the resistance necessary as the sunshade is pivoted between the position covering the windshield and the position covering the side window Platform 160 and rib 162 are shown extending above the substrate, the rib acting to space the cover from the base.

Wires 168 are shown extending from rod 136 and are those wires used to supply power to the illuminated vanity mirror portions of the sunshade. Wires 168 exit upwardly from the pivot rod and then traverse downwardly within wire guide area 169. The wires then make a right angle turn and exit through wire opening area 167. The wires are then positioned at the top of the substrate and may have a connector located at the end thereof for connecting to the modular headliner wire harness.

Base 170 is shown having a bezel engaged to the substrate and is additionally shown having screws 177 which may secure the base to the cover to form an integral fastener. Torque fitting support 180 is shown positioned to have torque fitting 164 resting thereon such that as the base is secured to the cover, the base through the torque fitting support will maintain the torque fitting in the desired position to secure the sunshade thereto. Pivot rod flange 178 and pivot rod 136 are also shown such that a decorative connection may be made between the pivot rod and the base. Pivot rod flange 178 may extend down the pivot rod and around a right angle bend therein.

FIG. 3B is a sectional view taken in FIG. 3A at the indicated location showing the various relationships between pivot rod 136 and the wires passing therethrough. Torque fitting 164 is shown encircling pivot rod 136 and includes key 151 extending outwardly to be engaged by the cover to prevent the torque fitting from rotating. Additionally shown are wire guide projections 165 defining a wire guide area 169 to which wires 168 may be enclosed and also serving to prevent the torque fitting from rotating.

FIG. 3C is a sectional view taken in FIG. 3A at the indicated location showing torque fitting opening 181 is sized to allow the rod with the torque fitting mounted thereto to pass through the torque fitting support. The rod and fitting are thereafter rotated such that the wire guide projections and the keyway of the torque fitting engage the torque fitting support to secure the torque fitting to the fastener. Torque fitting indent 183 helps retain the torque fitting in the rotated position prior to the assembly of the cover to the base.

Figure 4:
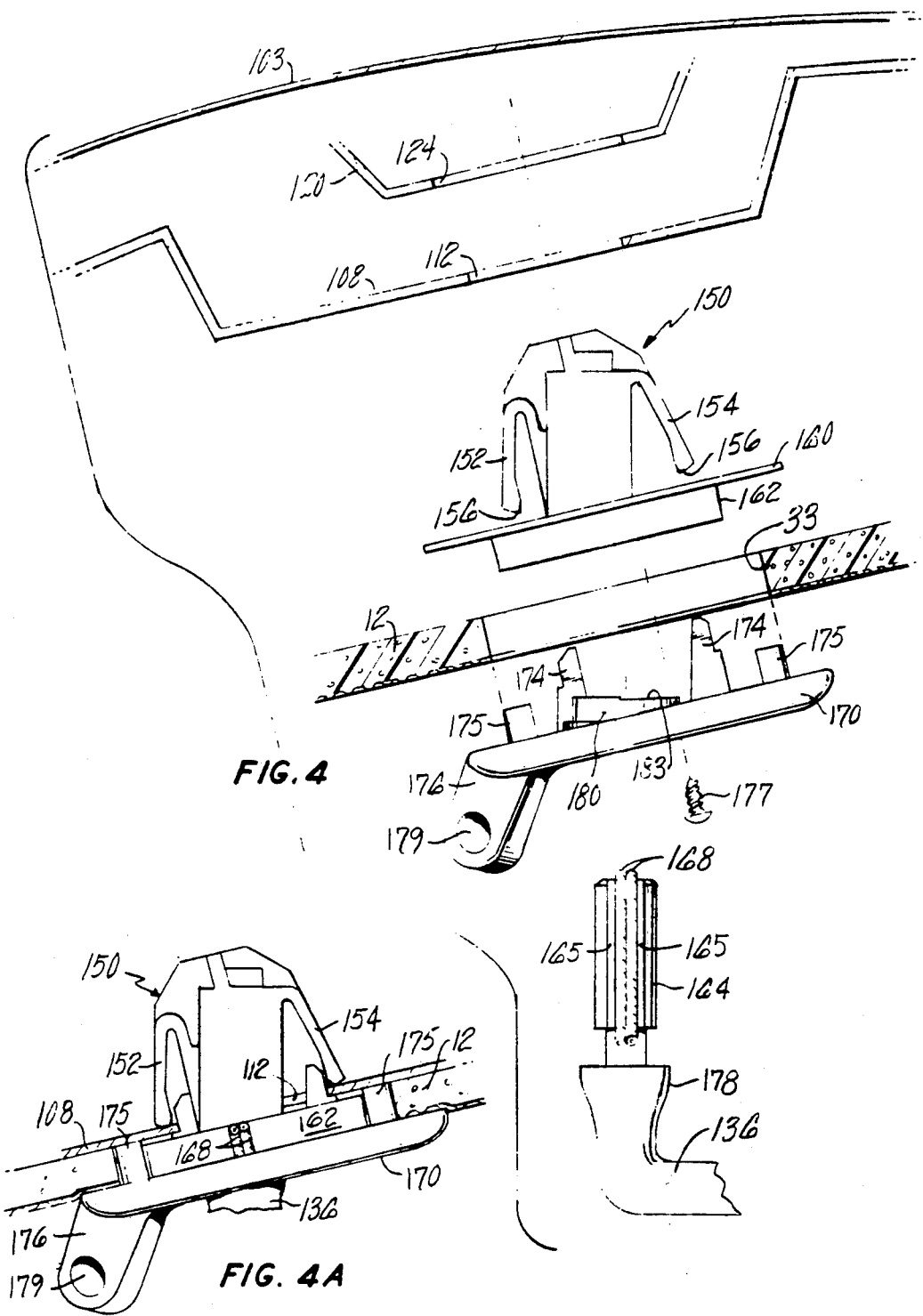
FIG. 4 is an exploded view of a headliner/sunshade fastener and vehicle parts to which it is assembled.

FIG. 4 is an exploded view of the fastener showing how the various parts go together. Starting at the bottom, it may be seen that pivot rod 136 has pivot rod flange 178 and torque fitting 164 secured thereto. Wire guide projections 165 are shown with wires 168 secured therebetween. The orientation of the torque fitting is shown in the as assembled configuration and not in the orientation necessary to pass through the base.

Base 170 is shown having projection for receiving secondary visor 176 and an opening for the receipt of the secondary visor rod 137. The torque fitting support 180 is shown for the receipt of the torque fitting on the rod. Centering arms 174 are shown extending upwardly from base 170 Substrate 12 is shown defining a substrate opening 33 through which the fastener may pass. Cover 150 is shown having flanges 152 and 154, a platform portion 160 and platform rib 162. An A-pillar inner 108 defining an opening 112 and header 120 defining header opening 124 are shown both positioned below roof 103.

Upon assembly of the fastener, a number of interactions happen to help secure the entire assembly in the desired position. The pivot rod is first mounted to the base by the torque fitting including the pivot rod being inserted through the base and then rotated to its assembled position. The pivot rod is thereby secured relative to the base by the fit of the torque fitting against the torque fitting support The base of the pivot rod is then placed against the substrate with the centering arms extending outwardly therethrough and the base ribs extending upwardly Cover 150 is then secured to the substrate with platform portion 160 engaging the top of the substrate and platform ribs 162 extending downwardly therethrough within the substrate opening 33, said ribs acting to form a spacer between the base and the cover such that the substrate is maintained within the space defined by the spacer and said ribs engaging the cover ribs to align the cover to the base and to transmit torque between the cover and the base. Centering arms 174 also includes notches therein for engaging the A-pillar inner to additionally provide spacing. Furthermore, the coacting ribs extend upwardly from the base to coact with the platform ribs to both align the fastener, center the fastener, and to additionally provide means for spacing the cover from the support.

The fastener is assembled by screws being inserted to secure the base portion to the cover portion. Thereafter, the entire assembly may be snap-fit to the vehicle. As may be seen in FIG. 3, the unassembled position, the cover is forced through a A-pillar opening 112 thereby compressing legs 152 and 154. In this position, the legs or flanges readily fit through the opening. Once the legs or flanges have passed through the opening, they are released since they are no longer in contact of the opening, and the legs spring outwardly to engage the vehicle body structure on the opposite side of the A-pillar inner such that the sunshade and headliner are mounted to the A-pillar inner. In this manner, the entire modular assembly or simply a sunshade or a sunshade/headliner combination are maintained in the desired position. The curvilinear ends of the flanges act to assure that the flanges will snap outwardly. The incline or the generally pointed nature of the top of the fastener assures that the fastener will enter the opening correctly to facilitate the displacement of the fastener relative to the opening, said displacement acting to compress the flanges until they snap outwardly.

Opening 112 is sized to allow the cover to pass therethrough and then to allow the fastener to slide in the left to right direction as viewed from FIG. 4. However, centering arms 174 extend upwardly and engage the edges of A-pillar inner 108 which define opening 112 and prevent the fastener from sliding in the left to right direction as seen therein.

Header opening 124 defined by header 120 as can be seen in FIG. 4 is larger than the cover as inserted therein However, in a plane perpendicular to the paper in FIG. 4, the header opening is sized to just receive cover 150, and hence movement of the fastener is limited, in the direction in and out of the paper, by the fit of the cover within the header opening.

Referring now to FIG. 4A, there can be seen a slightly different embodiment of the herein invention. In this embodiment, the fastener cover does not include a platform 160. Herein, the cover engages the A-pillar inner on one side and the base engages substrate 12 on the opposite side. This embodiment is specifically designed for subassembly as a fastener and sunshade combination to a vehicle or further in combination to also secure an already positioned headliner to the motor vehicle. It is contemplated that this fastener would be used with a subcombination of simply a sunshade and a fastener which may be used to both align an existing headliner and to provide support for the headliner and the fastener. This combination does not provide for the substrate to be sandwiched between the cover and the base. As may be seen in FIG. 4A, the components are essentially the same as those of the fastener of FIG. 4 and use the same reference numerals to refer thereto. Cover 150 includes flanges 154 and 152 which engage the upward side of A-pillar inner 108. Base 170 includes an outwardly extending bezel which engages substrate 12 as the fastener is assembled. Pivot rod 136, projection receiving secondary visor 176, and opening 179 are also shown.

Further as may be seen in the various FIGS., wires 168 exit the fastener through wire opening area 167. Hence, it may be seen in combination with FIG. 4A and FIG. 3A that various manner in which the wires transverse the fastener such that they may be connected to the modular headliner wire assembly.

As further can be seen in FIG. 4A, the entire fastener may be assembled including the sunshade assembled thereto, and then the fastener inserted through an opening in the substrate and then inserted through an opening in the sheet metal structure such that the substrate and sunshade to which the fastener is attached are both secured to the sheet metal structure.

Although not specifically apparent in FIGS. 3 or 4A, centering arms 174 extend upwardly within A-pillar opening 112 or a similar opening, however, they are not in alignment with flanges 154 and 152. Hence, flanges 154 and 152 act independently of the centering arms to snap into position regardless of location of the centering arms. In this manner, the free compression and expansion of the flanges as the fastener is displaced through the opening are not impacted by the centering arms.

Figure 5:
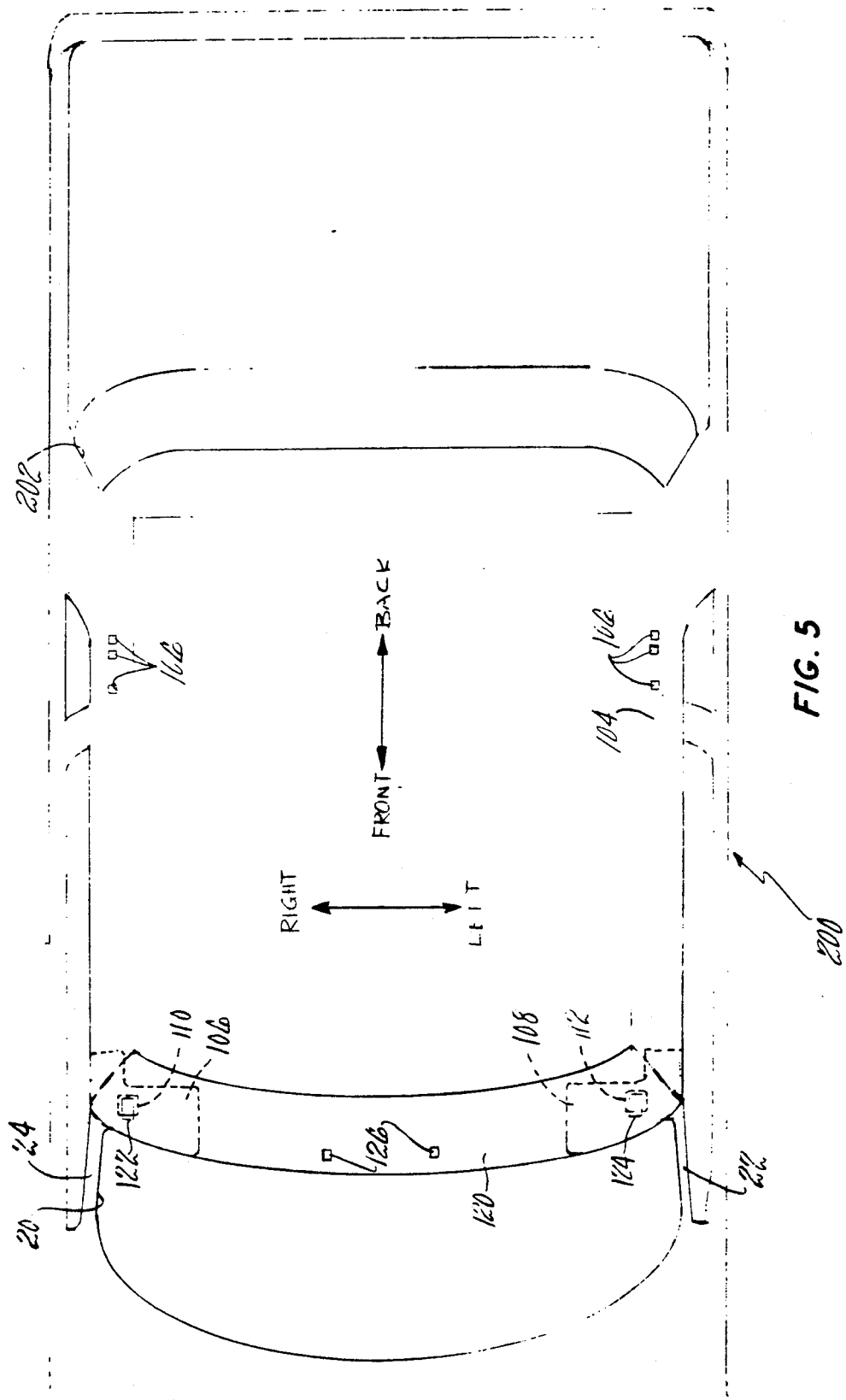
FIG. 5 is a top view of the vehicle body structure showing the mounting locations for a modular headliner.

FIG. 5 is a top view of a motor vehicle body structure. Specifically, there may be seen windshield opening 20, and rear window opening 202 of motor vehicle 200. Left A-pillar inner 108 is shown defining left A-pillar opening 112 having a longitudinal axis extending in a first (left to right) direction. Right A-pillar 106 is shown defining right A-pillar opening 110 whose longitudinal axis is similarly oriented. Header 120 is shown having header openings 122 and 124 whose longitudinal axes extend in a second direction (front to back) generally perpendicular to the first direction, and header inboard sunshade support openings 126. Additionally, side rails 104 are shown having openings 106. Additionally, various arrows are shown to indicate the left/right direction and the front/back directions relative to the vehicle.

When the modular headliner is assembled, fasteners 44 are displaced upwardly through various openings. A fastener will be displaced upwardly until the cover first engages the A-pillar inner 108. The operator will then through displacement of the angled end of cover 150 be able to feel when cover 150 enters into inner opening 112. The operator then displaces the modular headliner upwardly until the flanges pass through opening 112 and snap outwardly to engage the modular headliner to the vehicle body structure.

However, since the left A-pillar inner and the right A-pillar inner are two entirely separately distinct pieces of sheet metal which are assembled to the vehicle and are subject to manufacturing tolerances and variations, the relative positioning between the two is not always maintained constant. On the other hand, header 120 is a single stamping and contains a plurality of openings which are all fixed relative to one another. However, the header itself may not be necessarily secured to the A-pillar inners and the rest of the vehicle body structure always in the same position. Hence, the combination of openings overlapping one another being dimensioned such that each slot extends in its respective longitudinal direction, beyond the vertically adjacent slot, A-pillar opening 112 and header opening 124 and A-pillar opening 110 and header opening 122 are shown. In this manner, each opening acts to secure the displacement of the modular headliner in a single direction, but not the other direction whereby flexibility may be obtained in the manner in which the modular headliner is mounted. This flexibility is necessary to compensate for the various tolerance and variances during the assembly of the vehicle. In this manner, a single fastener may first be mounted to the vehicle structure and the modular headliner thereafter be pivoted to mate with the other openings while the entire modular headliner is aligned relative to the vehicle. By providing these sliding arrangements, a snap-fit fastening arrangement may be utilized to assemble the entire modular headliner. If no provision for relative displacement were provided, the vehicle build would have to have precise tolerances on the openings, presently unattainable, or some other method of adjusting the positioning of the modular headliner relative to the vehicle body structure would be necessary. However, with the provision of overlapping holes for allowing for sliding fits between the fastener and the combination of the headliner and the header of the A-pillar inner and the header, a snap-fit relationship is possible.

As may be specifically seen from FIGS. 2, 5 and 4, this various combination acts to allow a fastener to be inserted with the centering arms 74 securing the fastener relative to A-pillar opening 112, such that the fastener may be displaced in the left to right direction as shown in FIG. 5, but not the front to back direction. However, the cover is appropriately sized such that the cover is not retained in the front to back direction by the header opening such that relative to the header, the assembly may be slid in the front to back direction. However, the cover is sized in the left to right direction relative to the header opening such that the cover may not be slid in the left to right direction. Consequently, one opening for each fastener acts to maintain the modular headliner in the desired position at that location. Consequently, variations between the A-pillar inner and the header are accommodated without skewing the entire headliner module.

The invention has been described with reference to a particular embodiment. It is to be understood by those skilled in the art that variations and modifications can be made within the spirit and scope of the invention.

We claim:

1. A modular headliner for mounting to a motor vehicle having a passenger compartment and a roof, said vehicle including a body structure defining sheet metal openings, which comprises:

a substrate generally configured to fit adjacent the roof of the vehicle, said substrate defining a substrate opening having a periphery;

a sunshade for the motor vehicle including a pivot rod having an end and an end fitting on the pivot rod; and a sunshade substrate fastener for securing the sunshade to the substrate, said sunshade substrate fastener further including:

a base including a base rod opening through which the pivot rod extends, said base supporting the rod end fitting whereby the rod is retained therein, and a bezel portion sufficiently sized to cover the substrate opening at one surface of said substrate; and a cover secured to said base and receivable through at least one of said sheet metal openings from within said passenger compartment for mating with the bezel, said cover including a platform which when assembled to the base, is spaced from the base of spacer ribs said spacer ribs being located within the substrate opening generally parallel to the bezel portion, said platform extending around the periphery of said substrate opening at an opposite surface of said substrate to sandwich the substrate between the bezel portion and the platform portion; and means for securing the cover to the base such that the pivot rod and substrate are secured together by the sunshade substrate fastener independently of said body structure.

2. The apparatus as set forth in claim 1 wherein said cover further comprises a body portion to which the platform portion and the spacer ribs are connected, said body portion defining a central opening for the receipt of the end fitting on the pivot rod and a pair of flexible legs having ends and extending from said body portion, said body portion and flexible legs being sized when the legs are compressed to the body portion to fit through an opening having an edge and surrounded by sheet metal, and when said legs are released, the ends of the legs engage the sheet metal adjacent the opening to secure the fastener and both the sunshade and substrate to the body structure of the vehicle.

3. The apparatus as set forth in claim 2 wherein the base further comprises upwardly extending centering arms positioned to engage the edge of the sheet metal opening to center the fastener relative to the opening.

4. The apparatus as set forth in claim 2 wherein the end fitting of the pivot rod is a torque fitting and wherein the end fitting further comprises a wire guide and wherein the pivot rod includes a pair of wires, said wires extending out the end of the rod, along the wire guide and outwardly from the fastener.

5. The apparatus as set forth in claim 1 wherein the base further comprises means for mounting a second visor to the base.

6. The apparatus as set forth in claim 1 wherein the substrate defines an inboard substrate opening and further comprising an inboard sunshade support comprising a base including means for receiving a portion of the sunshade, and projecting fastening means extending upwardly from the base through the inboard substrate opening, said fastening means upon assembly of the headliner to the vehicle being positioned to coact with the body structure adjacent a sheet metal opening to secure the inboard sunshade support thereto.

7. The apparatus as set forth in claim 6 and further comprising retention means for retaining the inboard sunshade support to the substrate prior to assembly of the substrate to a motor vehicle.

* * * * *